United States Patent [19]

Samuels et al.

[11] 3,854,150

[45] Dec. 17, 1974

[54] JOINT FOR CUSHIONED TOILET SEAT

[76] Inventors: Stanley J. Samuels, 2031 Locust St.; Samuel Samuels, 1801 John F. Kennedy Blvd., both of Philadelphia, Pa. 19103

[22] Filed: June 14, 1973

[21] Appl. No.: 369,911

[52] U.S. Cl. ................. 4/237, 4/DIG. 8, 156/306, 161/44, 161/149
[51] Int. Cl. ............................................ A47k 13/02
[58] Field of Search ............. 4/112, 113.1, 98, 217, 4/234, 235, 237, 239, DIG. 6, DIG. 8; 156/306; 264/45; 161/44, 149

[56] References Cited
UNITED STATES PATENTS

| | | | |
|---|---|---|---|
| 2,658,512 | 10/1953 | Tcheong | 4/113 |
| 2,771,612 | 11/1956 | Samuels | 4/237 |
| 2,867,035 | 1/1959 | Patterson, Jr. | 161/44 |
| 3,263,370 | 8/1966 | Martinez | 161/44 |
| 3,468,731 | 9/1969 | Obeda | 156/306 |
| 3,528,872 | 9/1970 | Scholl et al. | 161/44 |
| 3,528,873 | 9/1970 | Scholl, et al. | 161/44 |

*Primary Examiner*—Donald E. Watkins
*Assistant Examiner*—Stuart S. Levy
*Attorney, Agent, or Firm*—Stanley Bilker

[57] ABSTRACT

An improved heat sealed joint for a cushioned toilet seat of a construction in which a plastic skin encapsulates a cushion element and a rigid base by heat sealing a facing and sole sheet thereabout. The new heat sealed joint utilizes a back-up or reinforcing strip secured to the margins of the base so as to underlie lapped together portions of the facing and sole sheets during welding thereof whereby a three-element trihedral joint is effected instead of the usual two.

3 Claims, 4 Drawing Figures

PATENTED DEC 17 1974　　　　　　　　　　　　3,854,150

JOINT FOR CUSHIONED TOILET SEAT

This invention relates to cushioned toilet seats, and more particularly relates to a cushioned toilet seat construction in which an annular base and cushioning element are encapsulated within a plastic skin formed by heat sealing the marginal edges of a facing and sole sheet.

In the fabrication of cushioned toilet seats of the foregoing character, a plastic skin, usually of a vinyl resin composition such as polyvinyl chloride, is stretched taut about the base and cushioning members, and the overlapped or pinched joints of the facing and sole sheets forming the skin are heat sealed at the marginal edges. A typical pinch-lapped seam construction is shown in our prior U.S. Pat. No. 2,771,612 while a typical overlapped seam construction is demonstrated in our prior U.S. Pat. No. 3,513,050. In each of these cases, a heated tool or iron or an induction or high frequency heating unit is drawn peripherally about the inner edge of the pinched or overlapped edge portions to effect a two-element weld of the plastic abutments. However, because of the stresses incurred at these heat welded joints during flexing of the cushioning element, there is a tendency for these prior heat seals to fail by splitting of the joints.

The present invention solves the aforementioned problem by reinforcing the lapped weld with a back-up weld thereby adding strength to the heat sealed joint. In this manner, each heat sealed joint incorporates a three-element weld rather than the hitherto employed two-element system.

It is therefore an object of this invention to provide a new and improved heat sealed lap joint for seaming the edges of the facing and sole sheets which define the plastic skin of cushioned toilet seats.

Another object of this invention is to provide a cushioned toilet seat in which all heat welded joints are reinforced with a back-up weld.

Still another object of this invention is to provide a cushioned toilet seat having heat sealed seams of greatly extended life.

Yet still another object of this invention is to provide a cushioned toilet seat whose heat sealed joints are resistant to flexure.

Other objects of this invention are to provide an improved device and method of the character described which is easily and economically produced, sturdy in construction, and both highly efficient and effective in operation.

With the above and related objects in view, this invention consists of the details of construction and combination of parts as will be more fully understood from the following detailed description when read in conjunction with the accompanying drawing in which.

Figure 1:
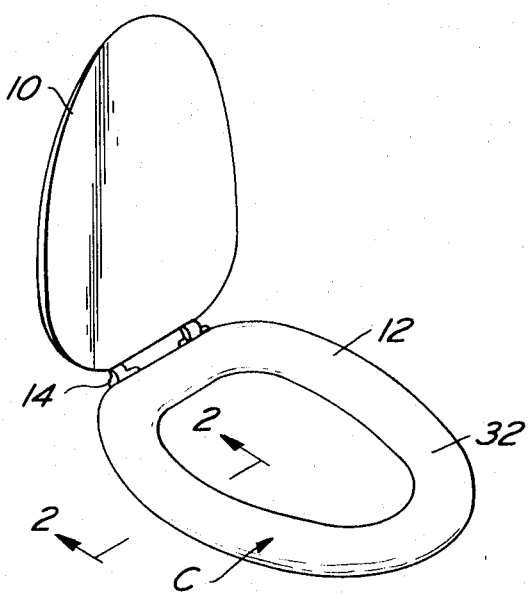
FIG. 1 is a perspective view of a cushioned toilet seat embodying this invention.

Referring now in greater detail to the drawing in which similar reference characters refer to similar parts, we show a cushioned toilet seat comprising a base member, generally designated as A, a cushioning element, generally designated as B, and a plastic skin encapsulating the base and the cushion, and generally designated as C.

The toilet seat assembly itself may be of any conventional design, as for example, one including a cover or back portion 10 coupled to a seat portion 12 through suitable hinges 14. The seat portion 12 is of generally elliptical configuration although the contour itself is not part of the instant invention.

The base A may be formed from wood, pressed sawdust or molded from a plastic composition. As shown herein, the base A has flat upper and lower surfaces 16 and 18 with interior and exterior edges 20 and 22 defining an annular configuration generally coextensive with the outline of the seat portion 10. However, the base A may also be plano-convex in cross-section as shown in our prior U.S. Pat. No. 3,513,050 or include arcuate edges or sides as set forth in our prior U.S. Pat. No. 2,771,612.

Strips 25 of plastic sheeting having the same composition as the plastic skin C are cemented in channel configuration to the corresponding interior and exterior edges 20 and 22 of the base A and also to the margins of the upper and lower surfaces 16 and 18 adjacent thereto. These channel strips 25 define the back-up material for the seams of the outer skin C when the latter is heat sealed thereabout. Any suitable cement may be used to adhere the back-up strips 25 to the base A, for example a rubber or other elastomeric adhesive.

The cushion element B is also of elliptical annular configuration, but is preferably plano-convex in cross-section having a lower planar face 28 coextensive with the upper surface of the base and an upper convex face 30 duplicating the conventional toilet seat contour. The cushion element B is fabricated from a resilient material, such as a foamed plastic or rubber latex or a blown type sponge. If desired, the lower planar face of the cushioning element may be adhesively secured to the upper surface 16 of the base A although such technique is not mandatory.

The skin C is formed from a plastic sheet, such as calendared polyvinyl chloride resin, and includes a facing portion 32 and a sole sheet 34. The facing 32 may be vacuum formed into an annular concave shape, as shown in our prior U.S. Pat. No. 3,513,050, prior to being stretched into pinched or overlapped engagement at the margins thereof with the margins of the sole sheet 34.

Figure 3:
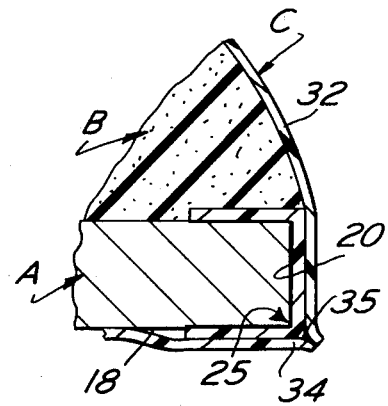
FIG. 3 is an enlarged fragmentary view of the encircled portion 3 in FIG. 2.
Figure 2:
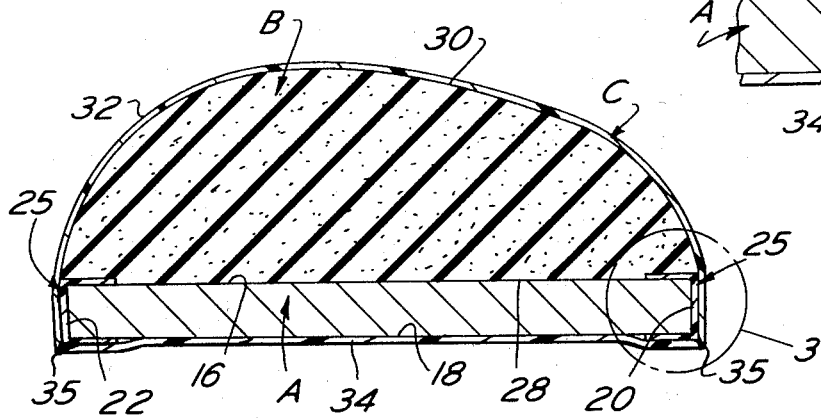
FIG. 2 is a sectional view taken along lines 2—2 of FIG. 1.
Figure 4:
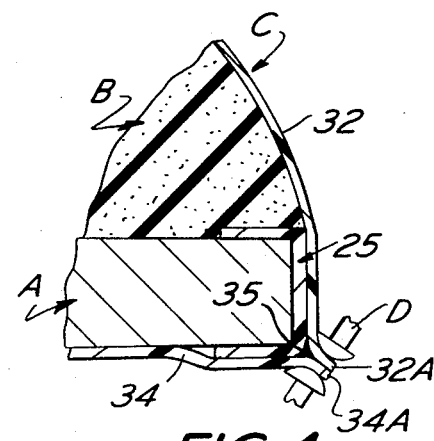
FIG. 4 is a fragmentary sectional view similar to that of FIG. 3 but prior to trimming.

In the instant invention, adjacent each corner of the base A at the lower surface thereof, the edges 32A of the facing 32 and the edges 34A of the sole sheet 34 are pinched together along with the underlying portion of the back-up element strip 25 within a heat sealing tool, generally designated as D, to form a trihedral corner weld 35 at the three abutting surfaces. This trihedral welded configuration is maintained as the welding tool D traverses the respective interior and exterior peripheries. FIG. 4 shows the crimped edges of the facing and sole sheets before they are trimmed while FIG. 3 illustrates the nature of the joints after they have been trimmed.

As is apparent from the foregoing description, the heat seal of the instant invention provides a trihedral welded joint 35 which involves three elements, the facing 32, the sole sheet 34, and the underlying back-up strip 25 in contradistinction to the two-element weld of the prior art. It is to be observed that by welding the skin components 32 and 34 to the back-up strip 25 the latter also adds reinforcement to the pinch lapped sections, thus forming a welded joint extremely resistant to splitting. Finally, it is to be observed that by welding the outer skin C to the back-up strip 25 which is itself adhered to the base A, the heat sealed joint is restrained from movement during flexure of the skin as the cushion element B is compressed.

Although this invention has been described in considerable detail, such description is intended as being illustrative rather than limiting, since the invention may be variously embodied without departing from the spirit thereof, and the scope of the invention is to be determined as claimed.

We claim:

1. A cushioned toilet seat comprising a rigid generally annular base having interior and exterior peripheral edges, a plastic back-up strip of generally U-shaped configuration cemented to the interior and exterior peripheral edges of said base along the margins thereof, a resilient cushioning element of annular configuration overlying said base, and a plastic skin encapsulating said base and said cushioning element, said plastic skin including an upper facing and a sole sheet, each of annular configuration and having inside and outside marginal edges in overlapped disposition adjacent the interior and exterior marginal edges of said base, the inside and outside marginal edges of said facing and said sole sheet being pinch lapped and heat sealed together in combination with the adjacent back-up strip to define a welded three-element joint of trihedral configuration.

2. The toilet seat of claim 1 wherein said back-up strips are of flexible material.

3. The toilet seat of claim 1 wherein said skin and back-up strips are comprised of polyvinyl chloride.

* * * * *